United States Patent
Kugler et al.

(10) Patent No.: US 11,120,605 B2
(45) Date of Patent: Sep. 14, 2021

(54) APPROXIMATE TRILINEAR FILTERING

(71) Applicant: Samsung Electronics Co., Ltd., Suwon-si (KR)

(72) Inventors: Anders M. Kugler, Campbell, CA (US); Aayush Ankit, West Lafayette, IN (US); Wilson Wai Lun Fung, Milpitas, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/828,926

(22) Filed: Mar. 24, 2020

(65) Prior Publication Data

US 2021/0217220 A1  Jul. 15, 2021

Related U.S. Application Data

(60) Provisional application No. 62/959,156, filed on Jan. 9, 2020.

(51) Int. Cl.
| | |
|---|---|
| *G06T 15/04* | (2011.01) |
| *G06T 1/20* | (2006.01) |
| *G06T 15/50* | (2011.01) |
| *G06T 1/60* | (2006.01) |

(52) U.S. Cl.
CPC ............... *G06T 15/04* (2013.01); *G06T 1/20* (2013.01); *G06T 1/60* (2013.01); *G06T 15/503* (2013.01); *G06T 2210/36* (2013.01)

(58) Field of Classification Search
CPC .. G06T 1/20; G06T 1/60; G06T 15/04; G06T 15/503; G06T 2210/36

USPC .......................................... 345/582, 587, 608
See application file for complete search history.

(56) References Cited

U.S. PATENT DOCUMENTS

| | | | |
|---|---|---|---|
| 6,292,193 B1 | 9/2001 | Perry et al. | |
| 6,452,603 B1* | 9/2002 | Dignam | ................... G06T 15/04 345/428 |
| 6,469,700 B1 | 10/2002 | Munshi et al. | |
| 6,995,767 B1* | 2/2006 | Donovan | ................. G06T 15/04 345/428 |
| 7,116,335 B2 | 10/2006 | Pearce et al. | |
| 7,372,467 B1* | 5/2008 | Toksvig | ................... G06T 15/04 345/582 |
| 7,372,468 B1 | 5/2008 | Toksvig et al. | |
| 7,692,662 B2 | 4/2010 | Ohba | |

(Continued)

*Primary Examiner* — Jacinta M Crawford
(74) *Attorney, Agent, or Firm* — Renaissance IP Law Group LLP

(57) ABSTRACT

A texture filtering unit and a method are disclosed that provide multiple variants of an approximate trilinear filtering operation. A texture sampling and filtering unit may be configured to determine a level-of-detail (LOD) value for a sample point in texture space, and select, based on the LOD value, a fine mip-level and a coarse mip-level from the mip-map. The closer of the two selected mip-levels to the sample point is determined, and farther of the two selected mip-levels from the sample point is determined. A first quad of texels in the closer mip-level and a second quad of texels in the farther mip-level are then determined. A total of five or fewer texels are selected from the first quad of texels and from the second quad of texels. A filtered value for the sample point is determined based on an approximate trilinear filtering operation on the selected texels.

20 Claims, 13 Drawing Sheets

(56) References Cited

U.S. PATENT DOCUMENTS 7,944,453 B1 * 5/2011 Newhall, Jr. ........... G06T 15/04
345/587

* cited by examiner

APPROXIMATE TRILINEAR FILTERING

CROSS-REFERENCE TO RELATED APPLICATION

This application claims the priority benefit under 35 U.S.C. § 119(e) of U.S. Provisional Application No. 62/959,156, filed on Jan. 9, 2020, the disclosure of which is incorporated herein by reference in its entirety.

TECHNICAL FIELD

The subject matter disclosed herein relates to graphics processing units (GPUs). More specifically, the subject matter disclosed herein relates to a texel sampling unit and a method that approximates a trilinear filter operation that runs at a same rate as a bilinear filtering operation.

BACKGROUND

A texture map may be provided by an application or a programming application programming interface (API) as a two-dimensional array. Elements in the two-dimensional array are called texels. When mapping the texture onto a surface represented in three dimensions (3D), certain areas may be minified depending on the aspect ratio between the texels and actual footprint covered on the surface.

Modern GPU hardware contains a texture sampling unit to fetch the texels and filter the texels for better anti-aliasing. Image quality may be substantially improved by using mip-maps. A mip-map may include multiple levels of texture maps, called mip-levels. The texture map at mip-level-0 is a base texture map at full resolution, and each successive mip-level is a down-filtered version of the previous map. The texture sampling unit may calculate a level-of-detail (LOD) from a texel-to-pixel aspect ratio between the texture footprint and the area in pixels in screen space covered by the texels from the projected texture footprint. The LOD may be used to index two mip-levels in the mip-map, a fine mip-level and a coarse mip-level, to best approximate the texture footprint.

Traditional trilinear filtering involves bilinear filtering of four texels from a fine mip-level, i.e., a fine bilerp; bilinear filtering of four texels from a coarse mip-level, i.e., a coarse bilerp; and a blending of the two bilerps using weights calculated from the LOD fractional portion (lod_frac). That is, a traditional trilinear operation involves two consecutive bilinear filter operations, and an implicit blend of the second bilerp with the first bilerp in the second clock. For each bilinear filter operation, the texture sampling unit fetches the four (4) neighboring texels (2×2) closest to the sample location, and interpolates the four texels using bilinear filtering. As such, trilinear filtering normally takes two (2) clocks to execute and samples eight (8) texels, and runs as half the speed of a bilinear filtering operation.

SUMMARY

An example embodiment provides a GPU that may include a memory and a texel sampling unit. The memory may store mip-levels of a mip-map. The texel sampling unit may be coupled to the memory, and may be configured to: determine an LOD value for a sample point in texture space; select, based on the LOD value, a fine mip-level and a coarse mip-level from the mip-map; determine which of the fine mip-level and the coarse mip-level selected based on the LOD value is closer to the sample point; determine which of the fine mip-level and the coarse mip-level selected based on the LOD value is farther away from the sample point; determine a first quad of texels in the mip-level closest to the sample point and a second quad of texels in the other mip-level farther away from the sample point in which the first quad of texels comprising four texels in a 2×2 arrangement of texels, the second quad of texels comprising four texels in a 2×2 arrangement of texels; select a total of five or fewer texels from the first quad of texels and from the second quad of texels; and determine a value for the sample point based on an approximate trilinear filtering operation on the selected texels. In one embodiment, the texel sampling unit may select the total of five or fewer texels from the first quad of texels and from the second quad of texels in a same clock cycle. In another embodiment, the texel sampling unit may be further configured to: determine weights to blend texels selected from the first quad of texels based on a Manhattan distance to the sample point; and determine weights to blend texels selected from the second quad of texels based on a Manhattan distance to the sample point. In yet another embodiment, the texel sampling unit may select a total of four texels in which two of the four texels may be selected from the first quad of texels and two of the four texels may be selected from the second quad of texels. In still another embodiment, the texel sampling unit may select a total of four texels, three of the four texels being selected from the first quad of texels and one of the four texels being selected from the second quad of texels in which three of the four texels may be selected from the first quad of texels are interpolated based on a barycentric interpolation.

An example embodiment provides a method to approximate trilinear filtering that may include: determining an LOD value for a sample point in texture space; selecting, based on the LOD value, a fine mip-level and a coarse mip-level from a mip-map; determining which of the fine mip-level and the coarse mip-level selected based on the LOD value is closer to the sample point; determining which of the fine mip-level and the coarse mip-level selected based on the LOD value is farther away from the sample point; determining a first quad of texels in the mip-level closest to the sample point and a second quad of texels in the mip-level farther away from the sample point in which the first quad of texels may include four texels in a 2×2 arrangement of texels, and the second quad of texels may include four texels in a 2×2 arrangement of texels; selecting a total of five or fewer texels from the first quad of texels and from the second quad of texels; and determining a value for the sample point based on an approximate trilinear filtering operation on the selected texels.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
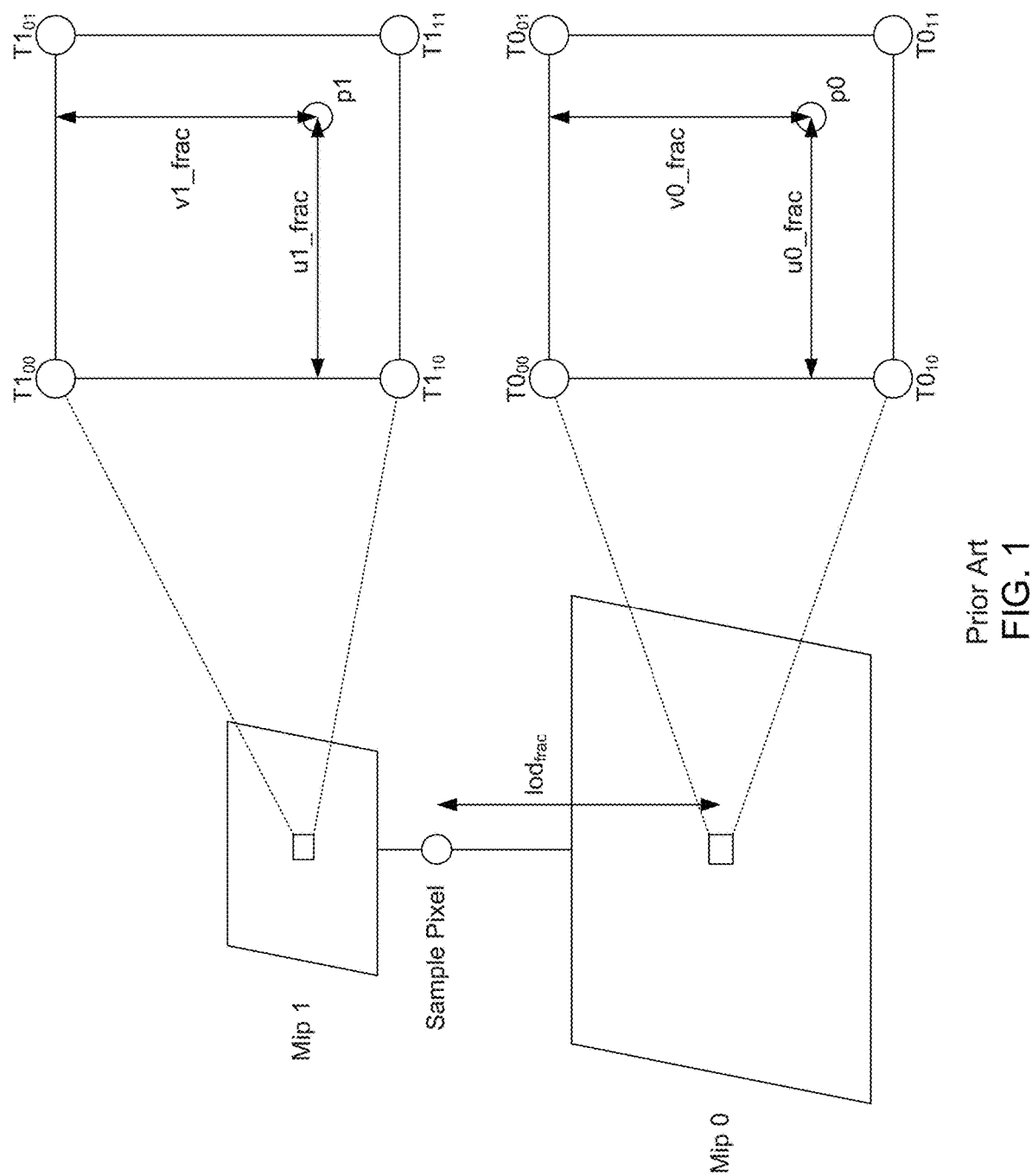
FIG. 1 depicts an example of a traditional trilinear filtering operation.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

In order to improve performance and to reduce power consumption, the subject matter disclosed herein approximates the trilinear filter operation with simple operations that occur within the same cycle, thereby allowing the operation run at a same rate as bilinear filtering.

FIG. 1 depicts an example of a traditional trilinear filtering operation. For a given sample location in texture space, the LOD and the two mip-levels from which to sample texels are first determined. In FIG. 1, a mip-level Mip 0 designates a fine level and a mip-level Mip 1 designates a coarse level that are sampled. A bilinear filter operation may be performed for each mip-level as, $$p0 = (1 - v0\_frac) * [(1 - u0_{frac}) * T0_{00} + u0_{frac} * T0_{01}] + v0\_frac * [(1 - u0\_frac) * T0_{10} + u0\_frac * T0_{11}]$$

$$p1 = (1 - v1\_frac) * [(1 - u1\_frac) * T1_{00} + u1\_frac * T1_{01}] + v1\_frac * [(1 - u1\_frac) * T1_{10} + u1\_frac * T1_{11}]$$

in which u0_frac and u1_frac represent the fractional portions of the horizontal unnormalized texture coordinates u0 and u1; v0_frac and v1_frac represent the fractional portions of the vertical unnormalized texture coordinates v0 and v1. (u0, v0) is the unnormalized texture coordinate in the fine mip-level Mip 0 and (u1, v1) is the unnormalized texture coordinate in the coarse mip-level Mip 1. The sample texels $T0_{00}$-$T0_{11}$ in the mip-level Mip 0, the sample texels $T1_{00}$-$T1_{11}$ in the mip-level Mip 1, $p_0$, $p_1$, v0_frac, v1_frac, u0_frac and u1_frac are indicated in FIG. 1. The final value for the sample may be determined, or filtered, as:

$$\text{pixel} = \text{lod\_frac} * p1 + (1 - \text{lod\_frac}) * p_0 \quad (3)$$

in which lod_frac represents the fractional part of the level-of-detail (LOD) used to blend p0 and p1, and is indicated in FIG. 1.

Trilinear filtering achieves a high level of image quality, and mip-mapping reduces aliasing because down-sampling removes high-frequency content from a texture map. Nevertheless, in a majority of GPU hardware implementations, trilinear filtering throughput is, at best, half of the throughput for bilinear filtering.

The subject matter disclosed herein provides multiple variants that approximate trilinear filtering, and provides improved performance and a reduction in power in comparison to traditional trilinear filtering.

A first variant disclosed herein that approximates trilinear filtering may be referred to as a Texel-4C approximate trilinear filtering, which samples a total of four (4) texels and uses mip-mapping to approximate a tri-lerp. Two texels from each mip-level may be selected based on a complementary texel heuristic.

A second variant disclosed herein that approximates trilinear filtering may be referred to as a Texel-4N approximate trilinear filtering, which also samples four (4) texels and uses mip-mapping to approximate a tri-lerp. The four texels are used to approximate a tri-lerp, and two texels from each mip-level may be selected based on a nearest texel heuristic.

A third variant disclosed herein that approximates trilinear filtering may be referred to as a Texel-5 approximate trilinear filtering, which samples a total of five (5) texels and uses mip-mapping to approximate a tri-lerp. A bilinear filter operation is used on one mip-level, and a single point-sample is selected on the other mip-level.

A fourth and a fifth variant of approximate trilinear filtering disclosed herein may be variations of the Texel-5 approximate trilinear filtering. The fourth variant may be referred to as a Texel-3+1C, and the fifth variant may be referred to as a Texel-3+1N. Instead of sampling four texels in the closer mip-level, only three (3) texel samples are selected. The three texels that are closest to the sample point in the closer mip-level are interpolated using a barycentric interpolation. In the mip-level that is farther from the sample point, the Texel-3+1C approximate trilinear filtering selects the texel that is the farthest from the sample point (i.e., a complementary texel). The Texel-3+N selects the texel that is the nearest to the sample point in the mip-level that is farthest from the sample point. The selected texels are then linearly interpolated to obtain the final filtered texture value between p0 and p1.

Figure 2:
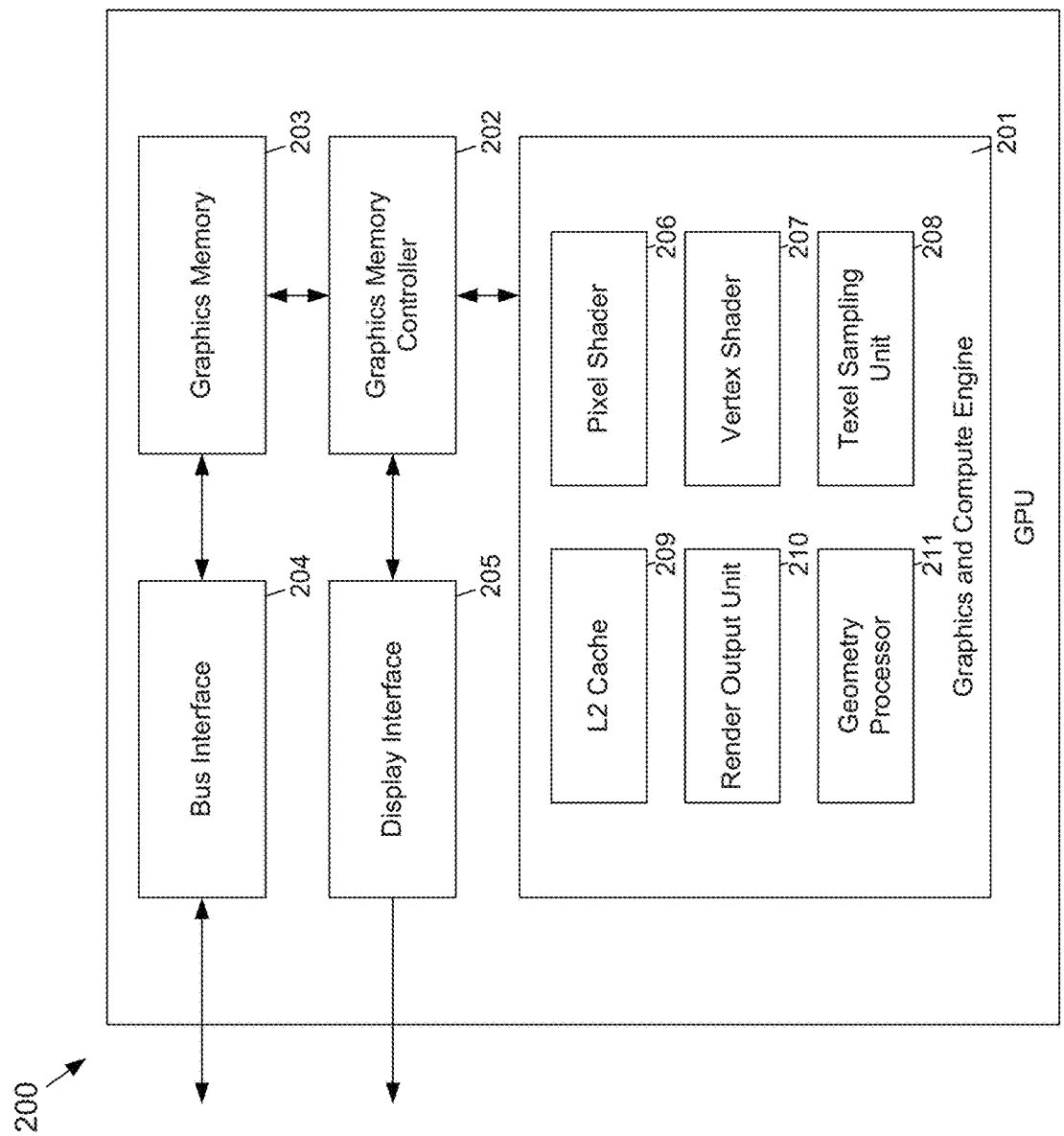
FIG. 2 depicts a block diagram of an example embodiment of a GPU that includes a texel sampling unit according to the subject matter disclosed herein

FIG. 2 depicts a block diagram of an example embodiment of a GPU 200 that includes a texel sampling unit (TSU) according to the subject matter disclosed herein. The GPU 200 may include a graphics and compute array 201, a graphics memory controller 202, a graphics memory 203, a bus interface 204, and a display interface 205. The graphics and compute array 202 may include one or more pixel shaders 206, one or more vertex shaders 207, a texel sampling unit 208, a level 2 (L2) cache 209, a render output unit 210, and a geometry processor 211. In one embodiment, the texel sampling unit 208 may be configured to provide at least one of the multiple variants that approximate trilinear filtering disclosed herein. It will be understood that the example embodiment of the GPU 200 may include additional components that are not shown.

Figure 3A:
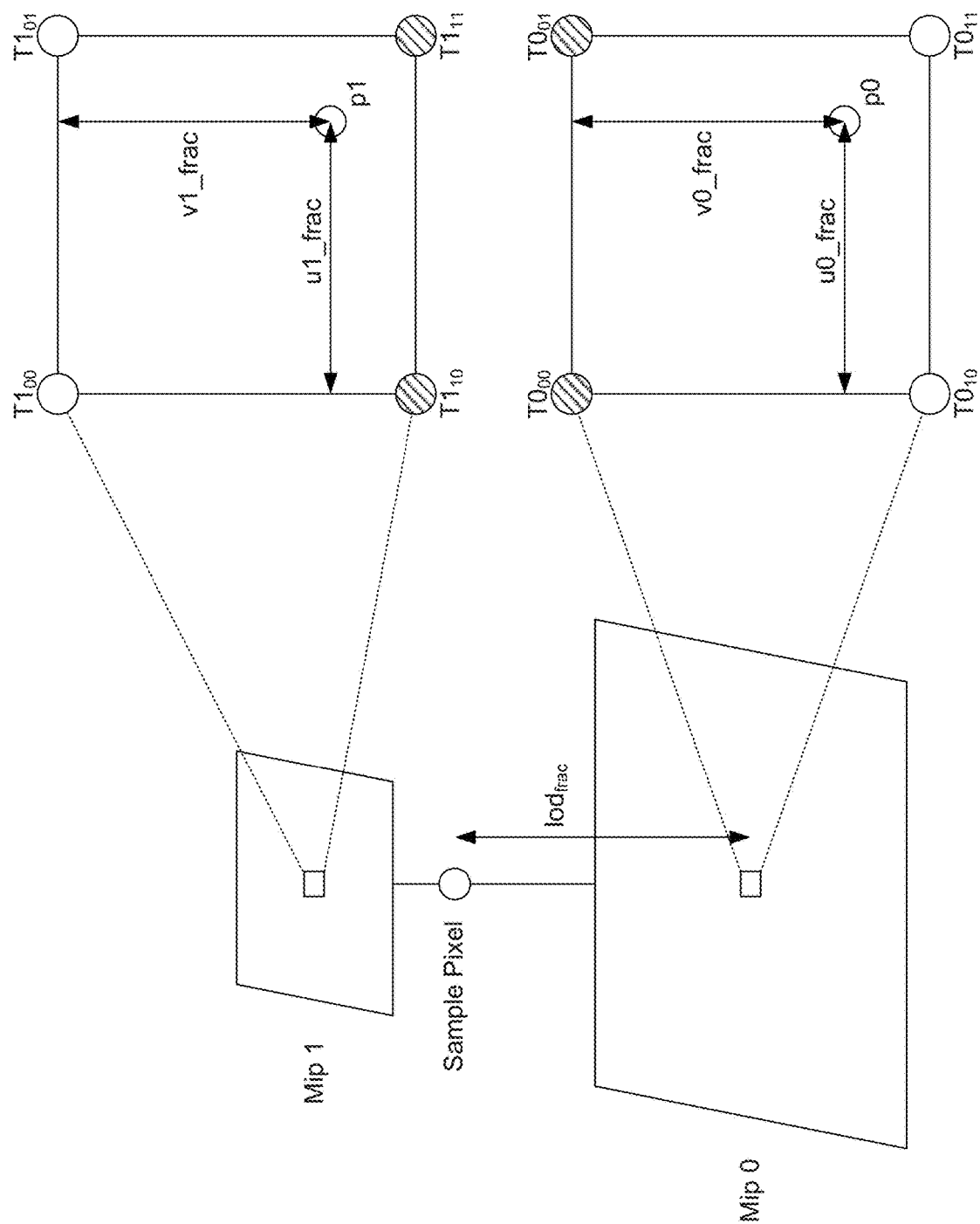
FIG. 3A depicts an example Texel-4C approximate trilinear filtering operation according to the subject matter disclosed herein.

FIG. 3A depicts an example Texel-4C approximate trilinear filtering operation according to the subject matter disclosed herein. Instead of fetching eight (8) texels as is done in traditional trilinear filtering, the Texel-4C approximation samples a total of four (4) texels. In the mip-level that is closer to the sample point, the two texels that are closest to the sample point (i.e., the point at the projection of the sample point into the mip-level) are used. A linear interpolation is used to determine, or compute, the filtered texture sample for that mip-level. If the mip-level that is closest to the sample location is the fine mip-level, then the result of the linear interpolation may be referred to as p0. If the mip-level that is closer to the sample location is the coarse mip-level, then the result of the linear interpolation may be referred to as p1.

In the mip-level that is farther from the sample point, the two texels that are the farthest from the sample point are used. The two texels selected in the mip-level that is farther from the sample point may be referred to as complementary texels to the two texels that are selected in the closer mip-level. A linear interpolation is used to determine, or compute, the filtered texture sample for that mip-level. If the mip-level that is farther from the sample point is the fine mip-level, then the result of the linear interpolation may be referred to as p0. If the mip-level that is farther from the sample point is the coarse mip-level, then the result of the linear interpolation may be referred to as p1.

After p0 and p1 have been obtained, the final value for the filtered texture sample may be obtained by performing linear interpolation between p0 and p1.

$$\text{pixel} = \text{lod\_frac} * p1 + (1 - \text{lod\_frac}) * p_0 \quad (4)$$

Figure 3B:
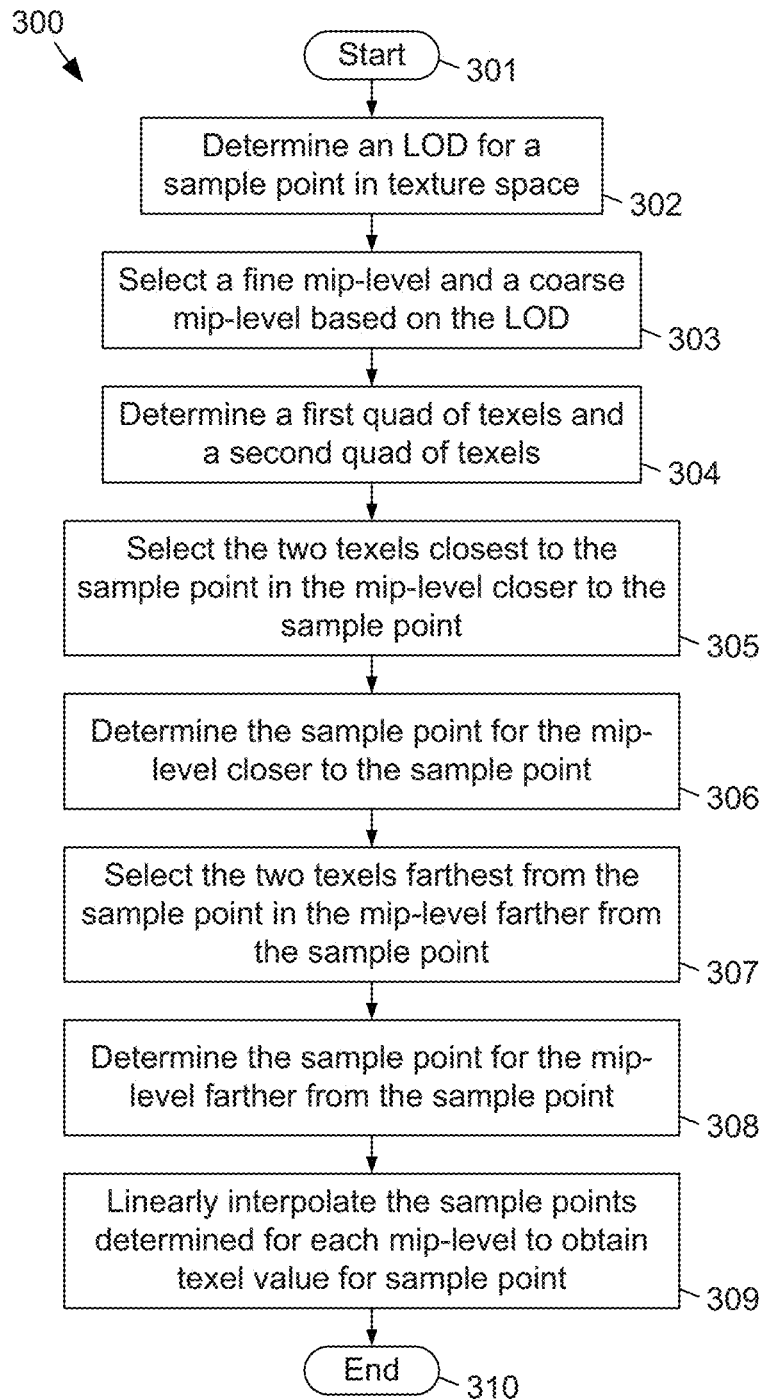
FIG. 3B is a flow diagram for an example Texel-4C approximate trilinear filtering operation according to the subject matter disclosed herein.

FIG. 3B is a flow diagram for an example Texel-4C approximate trilinear filtering operation 300 according to the subject matter disclosed herein. The operation starts at 301. At 302, an LOD value is determined for a sample location in texture space. At 303, a fine mip-level and a coarse mip-level are selected based on the LOD value. At 304, a first quad of texels is determined in the fine mip-level, and a second quad of texels is determined in the coarse mip-level. At 305, in the mip-level determined to be closer to the sample point, the two texels closest to the sample point are selected. At 306, the sample in the mip-level closer to the sample location is determined by a linear interpolation operation. At 307, in the mip-level determined to be farther from the sample point, the two texels farthest from the sample point are selected. That is, the two texels selected in the mip-level determined to be farther from the sample point that are complements to the two texels selected in the mip-level determined to be closer to the sample point. At 308, the sample point in the mip-level farther from to the sample point is determined by a linear interpolation operation. At 309, the two filtered texture samples for each mip-level are linearly interpolated to form the final value for the filtered value. At 310, the example Texel-4C approximate trilinear filter operation ends for the sample point.

For the example Texel-4C approximate trilinear filtering operation depicted in FIG. 3A, mip-level Mip 1 is depicted the closer of the two mip-levels to the sample location. In mip-level Mip 1, the texels having cross-hatching are the closest texels to the sample point p1. That is, the texels $T1_{10}$ and $T1_{11}$ are selected in the mip-level Mip 1. For the mip-level Mip 0, the two texels farthest away from sample point p0, or the two complementary texels indicated by cross-hatching, are selected. Specifically, the texels $T0_{00}$ and $T0_{01}$ are selected. If the mip-level Mip 0 were to be the closer of the two mip-levels, the texels $T0_{10}$ and $T0_{11}$ would have been selected in the mip-level Mip 0, and in the mip-level Mip 1, the texels $T1_{00}$ and $T1_{01}$ would have been selected. After p0 and p1 have been obtained, the final pixel value for the sample may be obtained by performing linear interpolation between p0 and p1 using Eq. (4).

Figure 4A:
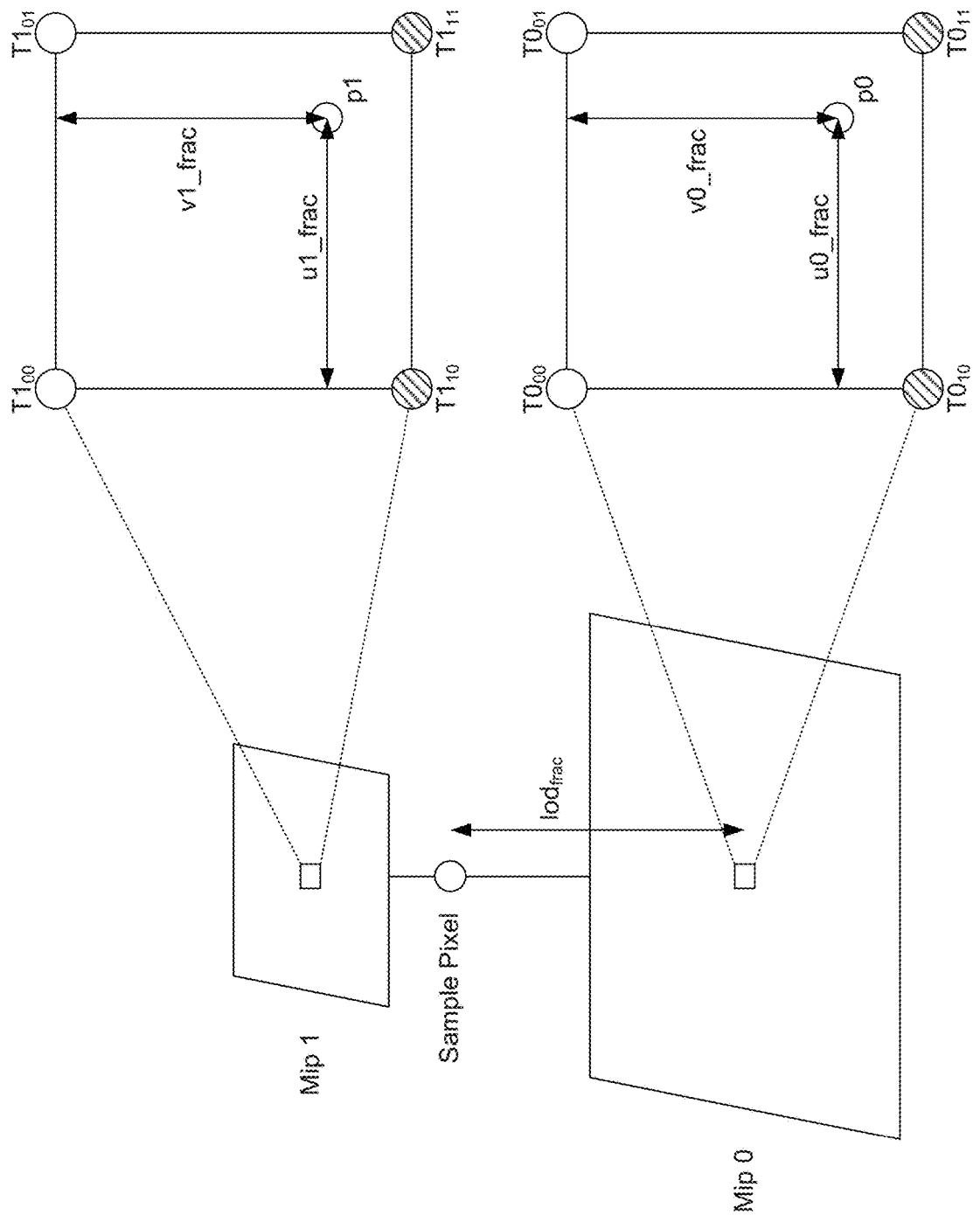
FIG. 4A depicts an example Texel-4N approximate trilinear filtering operation according to the subject matter disclosed herein.

FIG. 4A depicts an example Texel-4N approximate trilinear filtering operation according to the subject matter disclosed herein. Similar to the Texel-4C approximation, the Texel-4N approximation selects a total of four (4) texels. For both mip-levels, a linear interpolation is performed between the two texels in each mip-level that are the closest to the sample location in the respective mip-level to obtain p0 and p1.

Figure 4B:
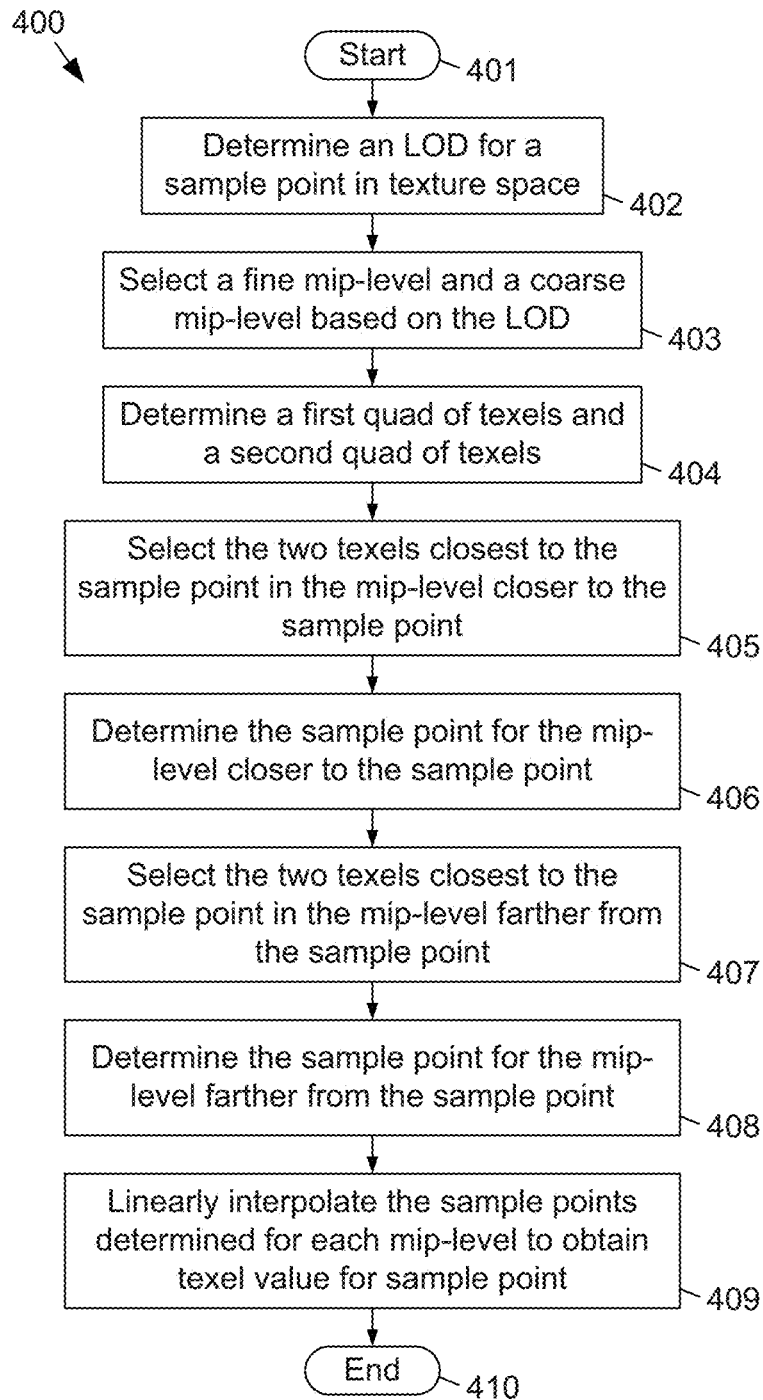
FIG. 4B is a flow diagram for an example Texel-4N approximate trilinear filtering operation according to the subject matter disclosed herein.

FIG. 4B is a flow diagram for an example Texel-4N approximate trilinear filtering operation 400 according to the subject matter disclosed herein. The operation starts at 401. At 402, an LOD value is determined for a sample location in texture space. At 403, a fine mip-level and a coarse mip-level are selected based on the LOD value. At 404, a first quad of texels is determined in the fine mip-level, and a second quad of texels is determined in the coarse mip-level. At 405, in the mip-level determined to be closer to the sample location, the two texels closest to the sample point are selected. At 406, the sample point in the mip-level closer to the sample location is determined by a linear interpolation operation. At 407, in the mip-level determined to be farther from the sample location, the two texels closest to the sample point are selected. At 408, the sample point in the mip-level farther from the sample location is determined by a linear interpolation operation. At 409, the two texture samples calculated in each mip-level are linearly interpolated to form the final texture value for the request. At 410, the example Texel-4N approximate trilinear filter operation ends for the texture filter request.

For the example depicted in FIG. 4A, the texels indicated by cross-hatching are selected because they are the nearest to the sample location in each Mip level. More specifically, in the mip-level Mip 0, the texels indicated by cross-hatching are the closest texels to the sample point p0, and in the mip-level Mip 1, the texels indicated by cross-hatching are the closest texels to the sample point p1. After p0 and p1 have been obtained, the final pixel value for the filtered texture sample may be obtained by performing linear interpolation between p0 and p1 as in Eq. (4).

Figure 5B:
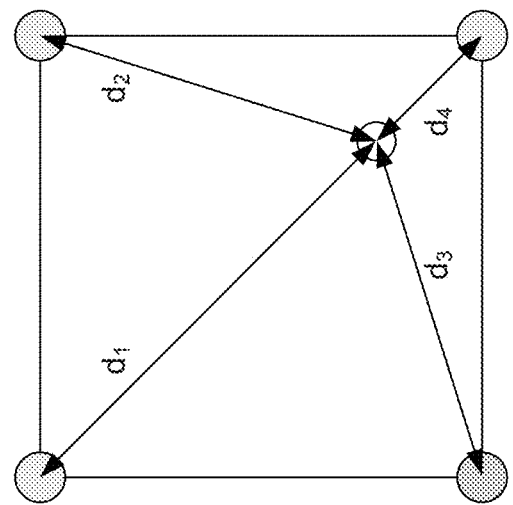
FIGS. 5A and 5B depict an example operation for determining filter weights according to the subject matter disclosed herein.
Figure 5A:
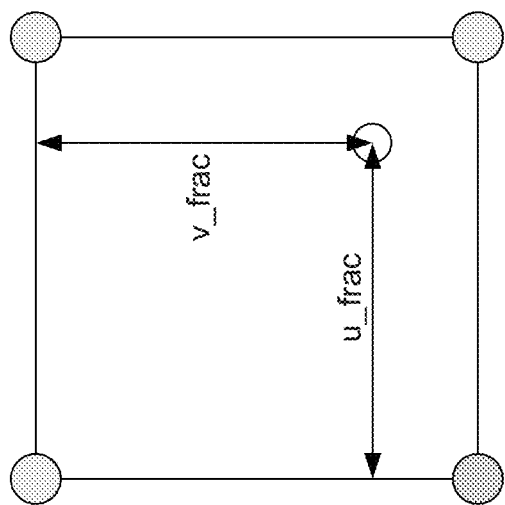

The Texel-4C approximation and the Texel-4N approximation use a different technique to calculate the filter weights because both approximation techniques select only two texels in a mip-level. FIGS. 5A and 5B depict an example operation for determining filter weights according to the subject matter disclosed herein. Given the bilinear weights that have at this point already been calculated in texture hardware, new weights may be derived using a normalized Manhattan distance.

In FIG. 5A, u_frac and v_frac correspond to the bilinear weights that have already been determined in the texture hardware. The Manhattan distances d1, d2, d3 and d4 indicated in FIG. 5B may be determined from the sample position to all 4 texels as $$d1 = u\_\text{frac} + v\_\text{frac}, \quad (5)$$

$$d2 = (1 - u\_\text{frac}) + v\_\text{frac}, \quad (6)$$

$$d3 = u\_\text{frac} + (1 - v\_\text{frac}), \text{ and} \quad (7)$$

$$d4 = (1 - u\_\text{frac}) + (1 - v\_\text{frac}). \quad (8)$$

If filtering based on only two texels, the two new weights are determined, or calculated, from the two distances by normalizing both distances.

Figure 6A:
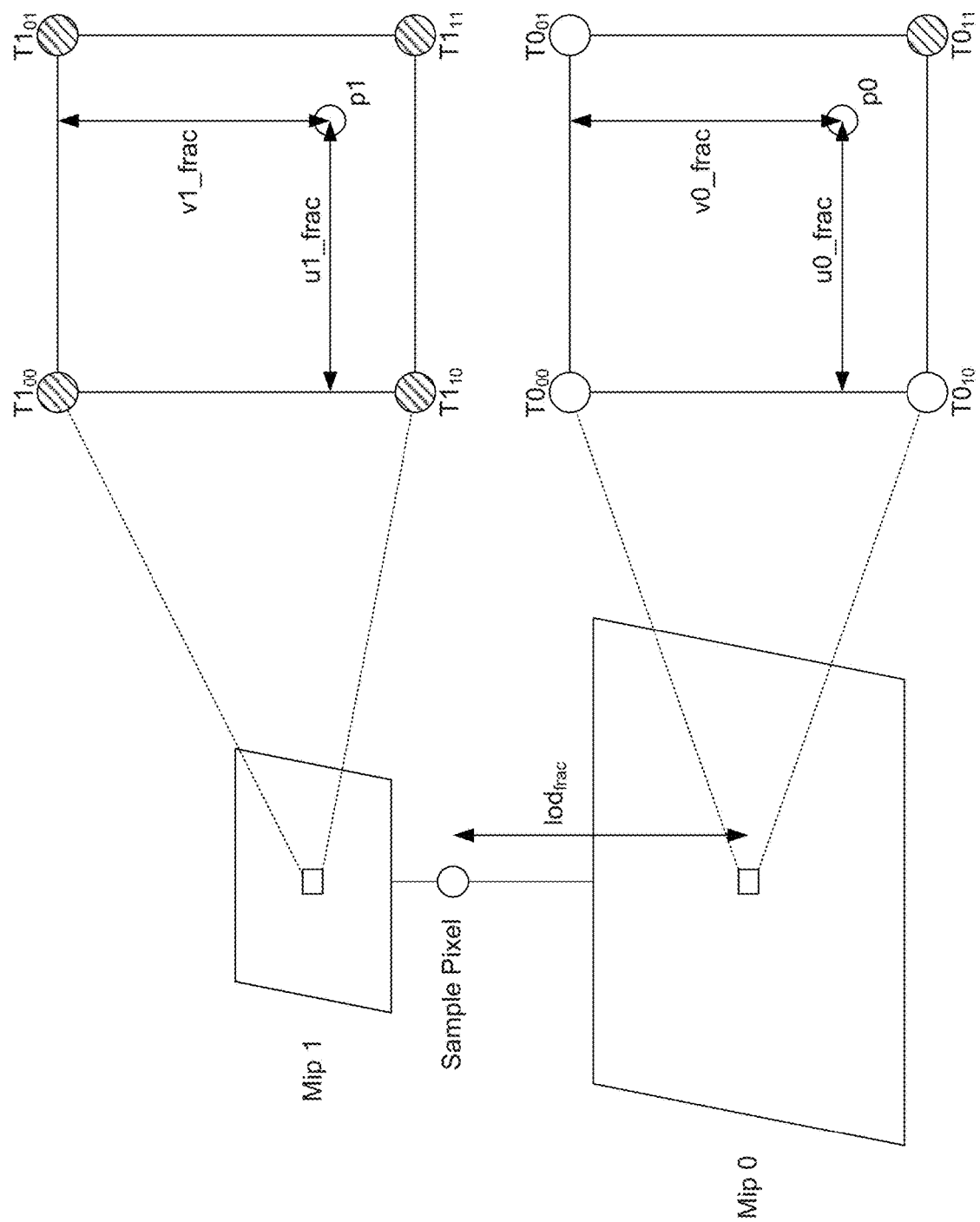
FIG. 6A depicts an example Texel-5 approximate trilinear filtering operation according to the subject matter disclosed herein.

FIG. 6A depicts an example Texel-5 approximate trilinear filtering operation according to the subject matter disclosed herein. For the Texel-5 approximation, the mip-level that is closer to the sample location is determined and the four texels of that mip-level are selected. A bilinear interpolation may be performed using the four selected texels. In the mip-level that is farther from the sample location, the texel that is the nearest to the sample point may be selected. The final value for the filtered sample may be obtained by linearly interpolating between the texels of the two mip-levels using Eq. (4).

Figure 6B:
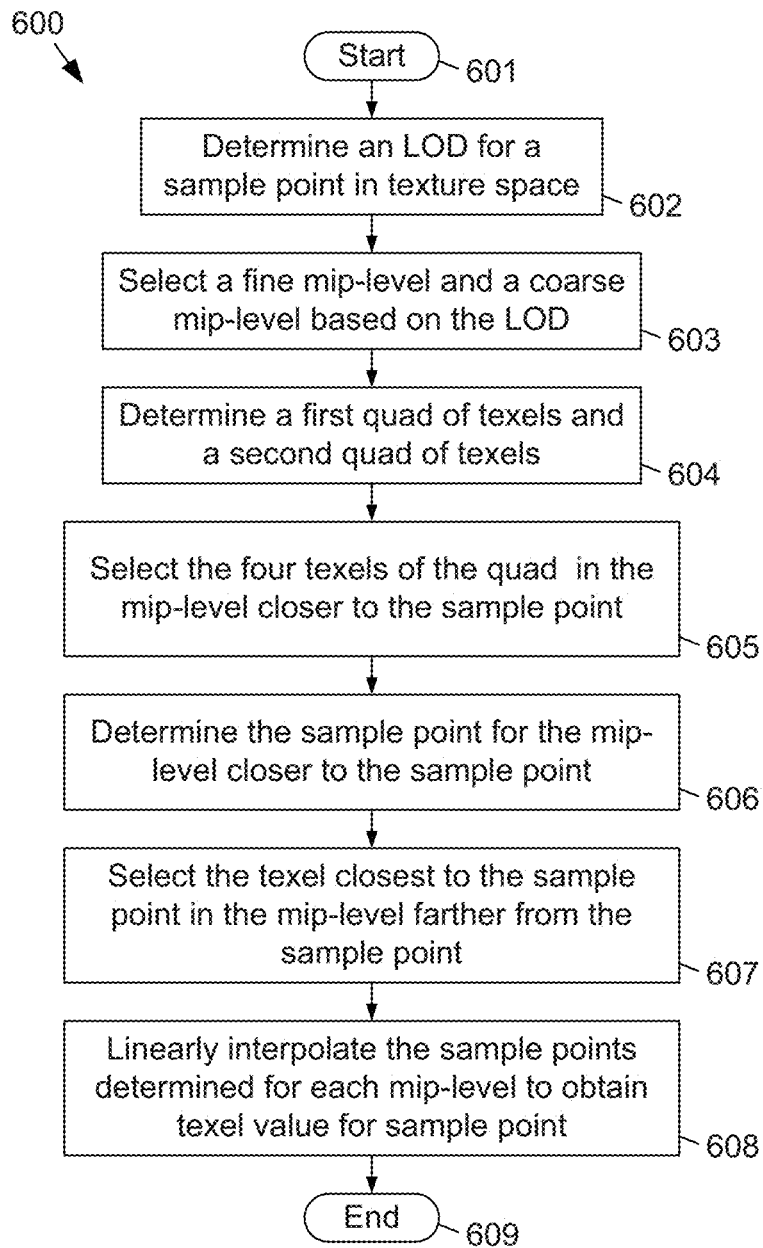
FIG. 6B is a flow diagram for an example Texel-5 approximate trilinear filtering operation according to the subject matter disclosed herein.

FIG. 6B is a flow diagram for an example Texel-5 approximate trilinear filtering operation 600 according to the subject matter disclosed herein. The operation starts at 601. At 602, an LOD value is determined for a sample location in texture space. At 603, a fine mip-level and a coarse mip-level are selected based on the LOD value. At 604, a first quad of texels is determined in the fine mip-level, and a second quad of texels is determined in the coarse mip-level. At 605, in the mip-level determined to be closer to the sample point, the four texels of the quad determined for that mip-level are selected. At 606, the sample point in the mip-level closer to the sample point is determined by a linear interpolation operation. At 607, in the mip-level determined to be farther from the sample point, the texel closest to the sample point is selected. At 608, the two filtered texture samples calculated in each mip-level are linearly interpolated to form the final texture value for the texture filter request. At 609, the example Texel-5 approximate trilinear filter operation ends for the texture filter request.

Referring to the example of FIG. 6A, the closer of the two mip-levels is depicted to be the mip-level Mip 1, and a bilinear interpolation may be performed using the four texels indicated by cross-hatching to obtain p1. In the mip-level Mip 0, the texel (indicated by cross-hatching) nearest to the sample position is selected as the sample point p0. The final texture value for the requested sample may be obtained by linearly interpolating between the p0 and p1 using Eq. (4).

The Texel-3+1C and the Texel-3+1N approximate trilinear filtering disclosed herein are variations of the Texel-5 approximate trilinear filtering. For both the Texel-3+1C and the Texel-3+1N approximate trilinear filtering only three (3) texels are chosen instead of selecting four (4) texels as is done for the Texel-5 approximate trilinear filtering. For both of the Texel-3+1C and Texel-3+1N approximations, the mip-level closer to the sample point is determined. In the closer mip-level, the three texels that are the closest to the sample point are selected, and the three selected texels are interpolated using a barycentric interpolation. In the mip-level determined to be farther from the sample location, the texel nearest to the sample point is selected for the Texel-3+1N approximate trilinear filtering as the sample point, whereas the texel that is the farthest from the sample point (i.e., the complementary texel to the nearest texel of the other mip-level) is selected. The final value for the requested texture sample are obtained by linearly interpolating between the calculated texture samples p0 and p1 using Eq. (4).

Figure 7:
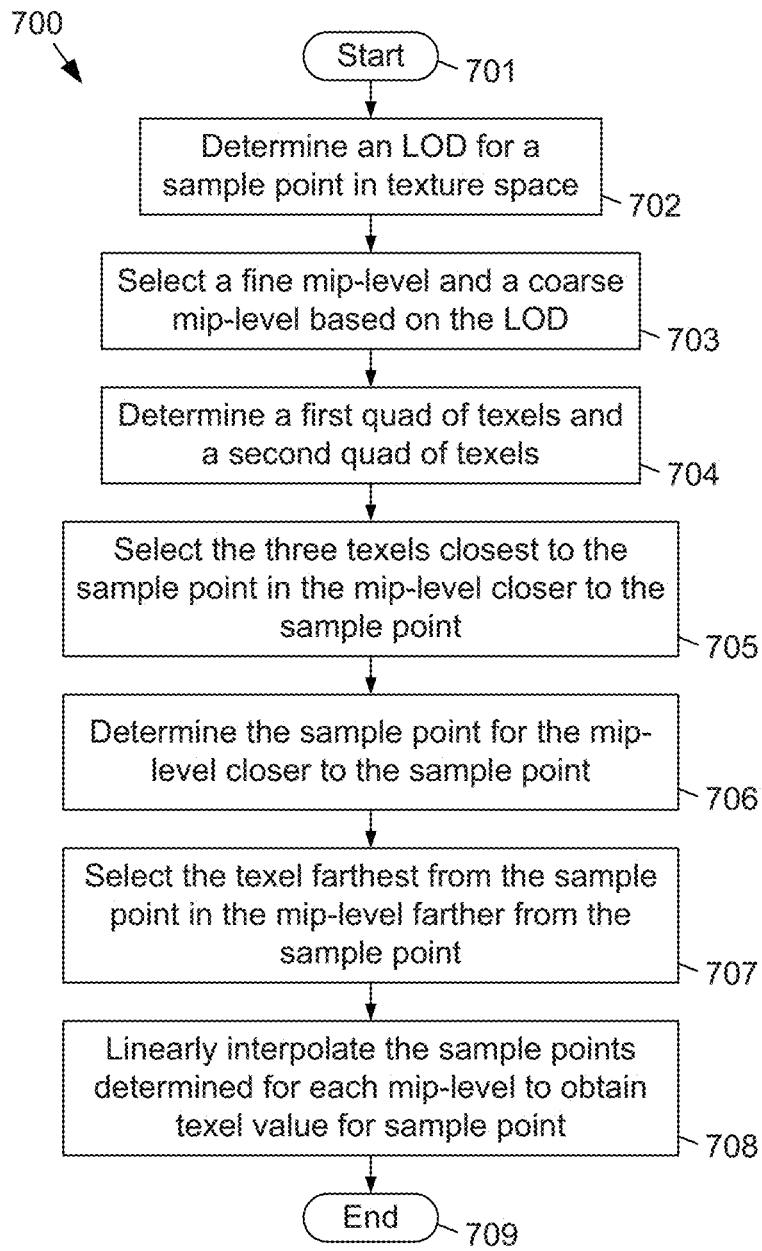
FIG. 7 is a flow diagram for an example Texel-3+1C approximate trilinear filtering operation according to the subject matter disclosed herein.

FIG. 7 is a flow diagram for an example Texel-3+1C approximate trilinear filtering operation 700 according to the subject matter disclosed herein. The operation starts at 701. At 702, an LOD value is determined for a sample location in texture space. At 703, a fine mip-level and a coarse mip-level are selected based on the LOD value. At 704, a first quad of texels is determined in the fine mip-level, and a second quad of texels is determined in the coarse mip-level. At 705, in the mip-level determined to be closer to the sample point, the three texels that are closest to the sample location are selected. At 706, the sample point in the mip-level closer to the sample point is determined by a linear interpolation operation. At 707, in the mip-level determined to be farther from the sample point, the texel farthest from the sample point is selected. That is, the texel selected in the mip-level determined to be farther from the sample location is a complement to the three texels selected in the mip-level determined to be closer to the sample location. At 708, the two calculated texture samples in each mip-level are linearly interpolated to form the texture value for the request. At 709, the example Texel-3+1C approximate trilinear filter operation ends for the texture request.

Figure 8:
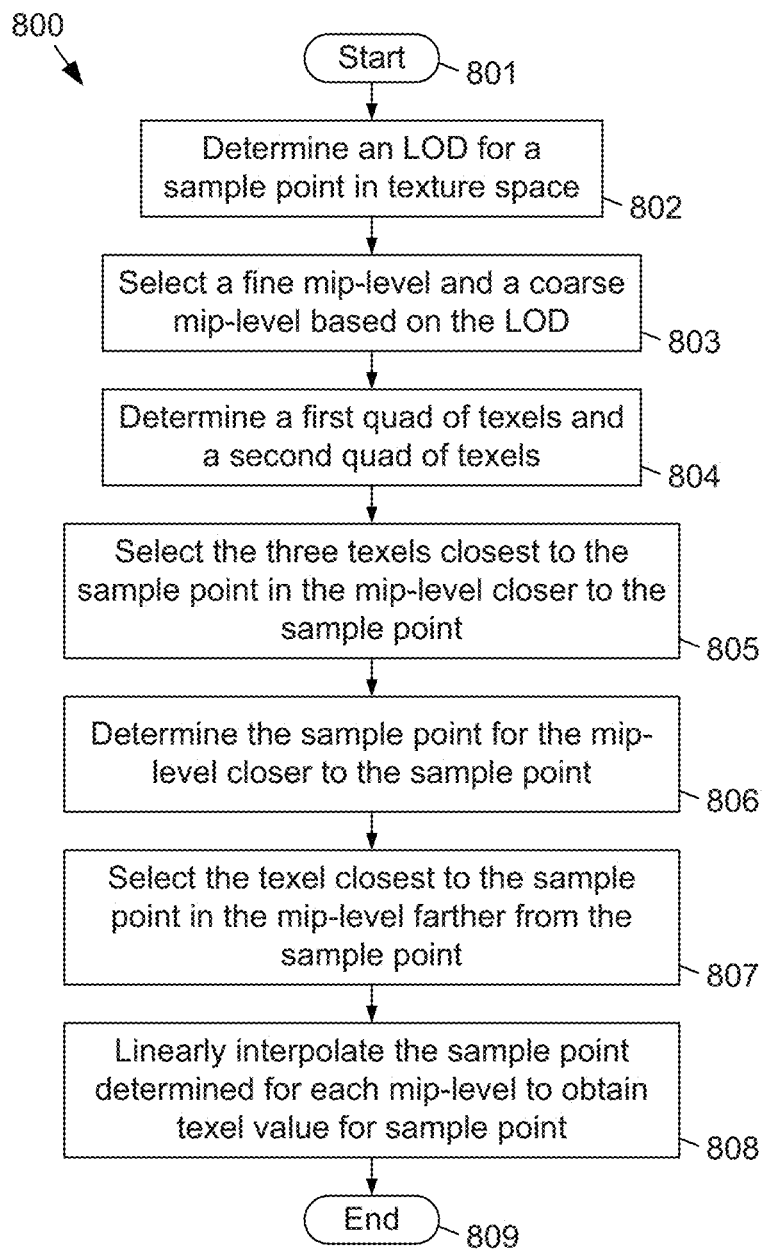
FIG. 8 is a flow diagram for an example Texel-3+1N approximate trilinear filtering operation according to the subject matter disclosed herein.

FIG. 8 is a flow diagram for an example Texel-3+1N approximate trilinear filtering operation 800 according to the subject matter disclosed herein. The operation starts at 801. At 802, an LOD value is determined for a sample location in texture space. At 803, a fine mip-level and a coarse mip-level are selected based on the LOD value. At 804, a first quad of texels is determined in the fine mip-level, and a second quad of texels is determined in the coarse mip-level. At 805, in the mip-level determined to be closer to the sample location, the three texels that are closest to the sample location are selected. At 806, the sample in the mip-level closer to the sample location is determined by a linear interpolation operation. At 807, in the mip-level determined to be farther from the sample location, the texel closest to the sample point is selected. At 708, the two filtered samples determined in each mip-level are linearly interpolated to form the final value for the sample point. At 709, the example Texel-3+1N approximate trilinear filter operation ends for the texture request.

The approximate trilinear filtering operations disclosed herein provides the greatest improvement in performance and reduction in power consumption in comparison to a traditional trilinear filtering operation if a sample point is farther from a midpoint between two mip-levels. Generally speaking, however, the sample location may fall anywhere between two mip-levels.

The approximate trilinear filtering techniques disclosed herein may provide the greatest improvements performance and reduction in power consumption in comparison to a traditional trilinear filtering operation if a sample location is farther from the midpoint between two mip-levels. Little or no benefit may be provided when the sample location is at or near lod_frac=0.5. In one embodiment, a lod_frac threshold may be used to define a window that is symmetrical around lod_frac=0.5 to control the number of trilerps to approximate. For example, such a window can be defined as follows.

$$\text{lod\_frac} \leq (x/8*0.5), \tag{9}$$

or $$\text{lod\_frac} \geq (1.0 - x/8*0.5). \tag{10}$$

A least aggressive threshold to use approximate trilinear filtering may be referred to herein as Approx_1, in which x in Eqs. (9) and (10) is set equal to 1. A most aggressive threshold to use approximate trilinear filtering may be referred to herein as Approx_8, in which x in Eqs. (9) and (10) is set equal to 8.

Figure 9A:
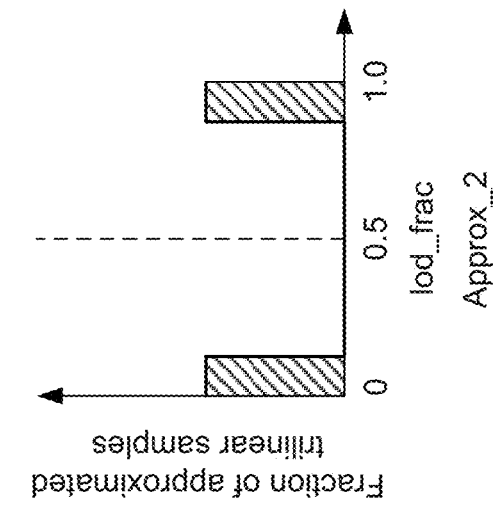
FIGS. 9A-9C respectively depict three example windows that may be used to control how many trilerps are approximated according to the subject matter disclosed herein.
Figure 9B:
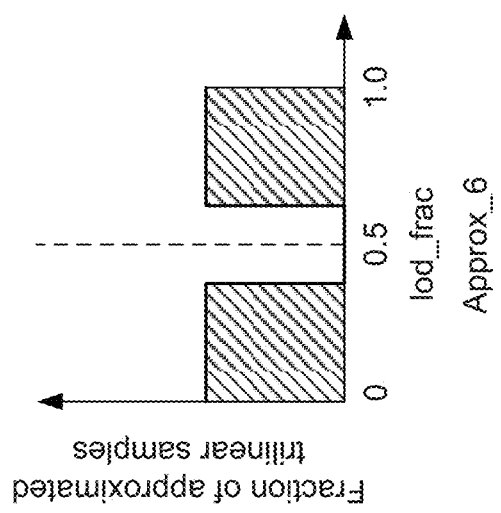
Figure 9C:
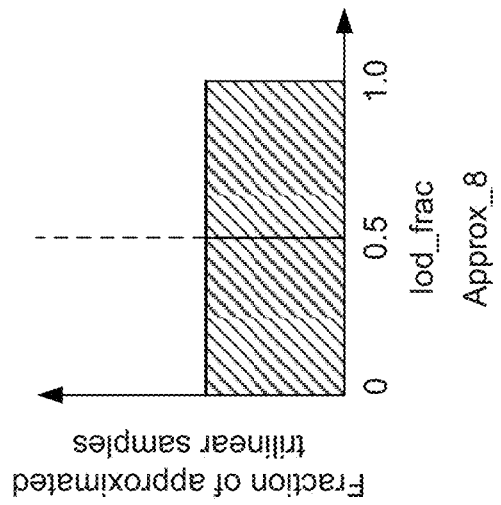

FIGS. 9A-9C respectively depict three example windows that may be used to control how many trilerps are approximated according to the subject matter disclosed herein. The abscissas of the graphs of FIGS. 9A-9C are lod_frac and the ordinates are fraction of approximated trilinear samples. The example window in FIG. 9A corresponds to an Approx_2 threshold setting. The example window in FIG. 9B corresponds to an Approx_6 threshold setting. The example window in FIG. 9C corresponds to an Approx_8 setting.

Figure 10:
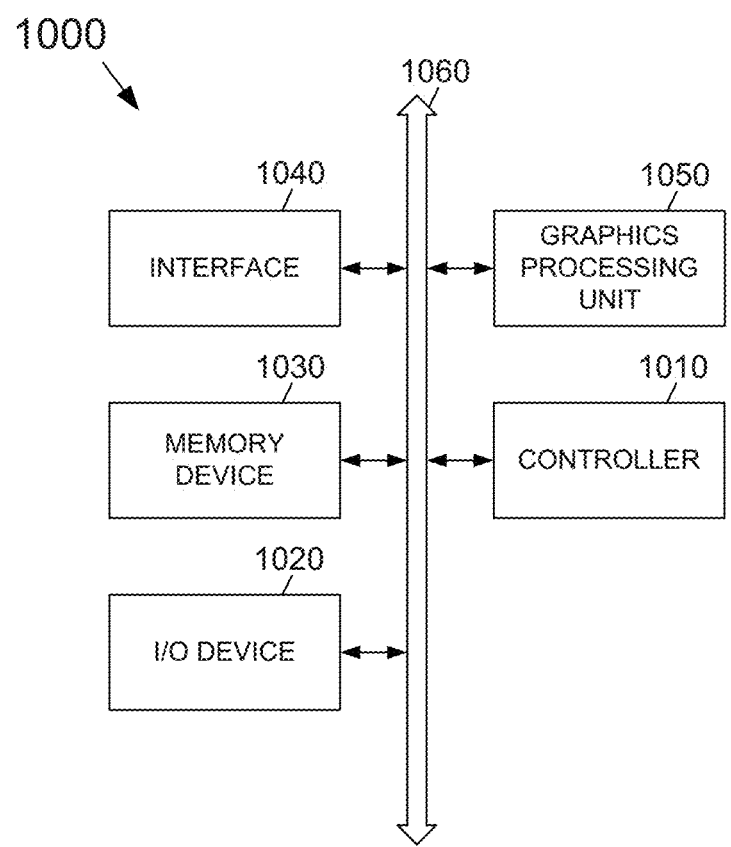
FIG. 10 depicts an electronic device that includes a GPU that includes a texel sampling unit according to the subject matter disclosed herein.

FIG. 10 depicts an electronic device 1000 that includes a GPU that includes a texel sampling unit according to the subject matter disclosed herein. Electronic device 1000 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 1000 may include a controller 1010, an input/output device 1020 such as, but not limited to, a keypad, a keyboard, a display, a touch-screen display, a camera, and/or an image sensor, a memory 1030, an interface 1040, and a GPU 1050 that are coupled to each other through a bus 1060. The controller 1010 may include, for example, at least one microprocessor, at least one digital signal processor, at least one microcontroller, or the like. The memory 1030 may be configured to store a command code to be used by the controller 1010 or a user data.

Electronic device 1000 and the various system components of electronic device 1000 may include the GPU 1050, which includes a texel sampling unit according to the subject matter disclosed herein. The interface 1040 may be configured to include a wireless interface that is configured to transmit data to or receive data from a wireless communication network using a RF signal. The wireless interface 1040 may include, for example, an antenna, a wireless transceiver and so on. The electronic system 1000 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions recited in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A graphics processing unit (GPU), comprising:
a memory that stores mip-levels of a mip-map; and
a texel sampling unit coupled to the memory, the texel sampling unit being configured to:
determine a level-of-detail (LOD) value for a sample point in texture space,
select, based on the LOD value, a fine mip-level and a coarse mip-level from the mip-map,
determine which of the fine mip-level and the coarse mip-level selected based on the LOD value is closer to the sample point,
determine which of the fine mip-level and the coarse mip-level selected based on the LOD value is farther away from the sample point,
determine a first quad of texels in the mip-level closest to the sample point and a second quad of texels in the other mip-level farther away from the sample point, the first quad of texels comprising four texels in a 2×2 arrangement of texels, the second quad of texels comprising four texels in a 2×2 arrangement of texels,
select a total of five or fewer texels from the first quad of texels and from the second quad of texels, and
determine a value for the sample point based on an approximate trilinear filtering operation on the selected texels.

2. The GPU of claim 1, wherein the texel sampling unit selects the total of five or fewer texels from the first quad of texels and from the second quad of texels in a same clock cycle.

3. The GPU of claim 1, wherein the texel sampling unit is further configured to:
determine weights to blend texels selected from the first quad of texels based on a Manhattan distance to the sample point; and
determine weights to blend texels selected from the second quad of texels based on a Manhattan distance to the sample point.

4. The GPU of claim 1, wherein the texel sampling unit selects a total of four texels, two of the four texels being selected from the first quad of texels and two of the four texels being selected from the second quad of texels.

5. The GPU of claim 4, wherein the texels selected in first quad of texels are the texels that are closest to the sample point, and
wherein the texels selected in the second quad of texels are the texels that are closest from the sample point.

6. The GPU of claim 4, wherein the texel sampling unit selects the texels in first quad of texels that are the texels that are farthest from the sample point, and
wherein the texel sampling unit selects the texels in the second quad of texels that are the texels that are closest from the sample point.

7. The GPU of claim 1, wherein the texel sampling unit selects the texel in the first quad of texels that is closest to the sample point, and
wherein the texel sampling unit selects the four texels of the second quad of texels.

8. The GPU of claim 1, wherein the texel sampling unit selects a total of four texels, three of the four texels being selected from the first quad of texels and one of the four texels being selected from the second quad of texels, and
wherein the three of the four texels selected from the first quad of texels are interpolated based on a barycentric interpolation.

9. The GPU of claim 8, wherein the texel selected from the second quad of texels is farthest from the sample point.

10. The GPU of claim 8, wherein the texel selected from the second quad of texels is closest to the sample point.

11. A method to approximate trilinear filtering, the method comprising:
determining a level-of-detail (LOD) value for a sample point in texture space;
selecting, based on the LOD value, a fine mip-level and a coarse mip-level from a mip-map;
determining which of the fine mip-level and the coarse mip-level selected based on the LOD value is closer to the sample point;
determining which of the fine mip-level and the coarse mip-level selected based on the LOD value is farther away from the sample point;
determining a first quad of texels in the mip-level closest to the sample point and a second quad of texels in the mip-level farther away from the sample point, the first quad of texels comprising four texels in a 2×2 arrangement of texels, and the second quad of texels comprising four texels in a 2×2 arrangement of texels;
selecting a total of five or fewer texels from the first quad of texels and from the second quad of texels; and
determining a value for the sample point based on an approximate trilinear filtering operation on the selected texels.

12. The method of claim 11, wherein selecting the total of five or fewer texels from the first quad of texels and from the second quad of texels is performed in a same clock cycle.

13. The method of claim 11, further comprising:
determining weights to blend texels selected from the first quad of texels based on a Manhattan distance to the sample point; and
determining weights to blend texels selected from the second quad of texels based on a Manhattan distance to the sample point.

14. The method of claim 11, wherein a total of four texels are selected, two of the four texels being selected from the first quad of texels and two of the four texels being selected from the second quad of texels.

15. The method of claim 14, wherein the texels selected in first quad of texels are the texels that are closest to the sample point, and
wherein the texels selected in the second quad of texels are the texels that are closest from the sample point.

16. The method of claim 14, wherein the texels selected in first quad of texels are the texels that are farthest from the sample point, and
wherein the texels selected in the second quad of texels are the texels that are closest from the sample point.

17. The method of claim 11, wherein the texel selected in the first quad of texels is closest to the sample point, and
wherein the four texels of the second quad of texels are selected.

18. The method of claim 11, wherein a total of four texels are selected, three of the four texels being selected from the first quad of texels and one of the four texels being selected from the second quad of texels
the method further comprising:
interpolating the three of the four texels selected from the first quad of texels based on a barycentric interpolation.

19. The method of claim 18, wherein the texel selected from the second quad of texels is farthest from the sample point.

20. The method of claim 18, wherein the texel selected from the second quad of texels is closest to the sample point.

* * * * *